(12) United States Patent
Rice et al.

(10) Patent No.: US 10,473,472 B2
(45) Date of Patent: *Nov. 12, 2019

(54) PAYMENT OF HIGHWAY TOLLS VIA A MOBILE TELECOMMUNICATIONS NETWORK

(71) Applicant: AT&T Intellectual Property I, L.P., Atlanta, GA (US)

(72) Inventors: Christopher W. Rice, Parsippany, NJ (US); Rittwik Jana, Montville, NJ (US); John F. Murray, Denville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1075 days.

This patent is subject to a terminal disclaimer.

(21) Appl. No.: 14/797,771

(22) Filed: Jul. 13, 2015

(65) Prior Publication Data
US 2015/0317843 A1 Nov. 5, 2015

Related U.S. Application Data

(63) Continuation of application No. 12/435,675, filed on May 5, 2009, now Pat. No. 9,109,911.

(51) Int. Cl.
*G07B 15/00* (2011.01)
*G01C 21/34* (2006.01)
(Continued)

(52) U.S. Cl.
CPC .......... *G01C 21/3407* (2013.01); *G01C 21/34* (2013.01); *G01C 21/3697* (2013.01);
(Continued)

(58) Field of Classification Search
CPC ............... G01C 21/3407; G01C 21/34; G01C 21/3697; G06Q 40/12; G06Q 20/16;
(Continued)

(56) References Cited

U.S. PATENT DOCUMENTS 5,857,152 A 1/1999 Everett
6,278,935 B1 * 8/2001 Kaplan .................. G01C 21/26
235/384

(Continued)

OTHER PUBLICATIONS

Mehrotra, Asha, "Cellular Radio Performance Engineering", 1994, Artech House Inc., p. 489 (Year: 1994).*

(Continued)

*Primary Examiner* — George Chen
*Assistant Examiner* — Wayne S. Murray
(74) *Attorney, Agent, or Firm* — Chiesa Shahinian & Giantomasi PC (57) ABSTRACT

Disclosed are method and apparatus for processing of highway toll payments by a mobile telecommunications service provider. A mobile telecommunications device communicates with a mobile telecommunications service provider. The mobile telecommunications service provider receives a request to calculate a route to a destination. The mobile telecommunications service provider determines the location of the mobile telecommunications device from a global navigation satellite system or from a mobile telecommunications network and calculates a route. The mobile telecommunications service provider then identifies toll booths along the calculated route. The mobile telecommunications service provider pre-pays the tolls. The mobile telecommunications service provider sends turn-by-turn instructions to the mobile telecommunications device and tracks the location of the mobile telecommunications device and records the date and time at which the mobile telecommunications device passes through a toll booth.

17 Claims, 6 Drawing Sheets

(51) Int. Cl.
G06Q 20/32 (2012.01)
H04M 15/00 (2006.01)
G01C 21/36 (2006.01)
G06Q 20/16 (2012.01)
G07B 15/06 (2011.01)
G06Q 40/00 (2012.01)

(52) U.S. Cl.
CPC .............. *G06Q 20/16* (2013.01); *G06Q 20/32* (2013.01); *G06Q 20/325* (2013.01); *G06Q 40/12* (2013.12); *G07B 15/063* (2013.01); *H04M 15/68* (2013.01); *H04M 15/8033* (2013.01)

(58) Field of Classification Search
CPC .... G06Q 20/32; G06Q 20/325; G07B 15/063; H04M 15/68; H04M 15/8033
USPC .......................................................... 705/13
See application file for complete search history.

(56) References Cited

U.S. PATENT DOCUMENTS

RE39,736 E    7/2007  Morrill
2005/0119010 A1  6/2005  Yasukawa
2006/0064345 A1* 3/2006  Biet ..................... G07B 15/063
                                                       705/13
2007/0275731 A1  11/2007  Alfert et al.
2007/0285280 A1* 12/2007  Robinson ............. G07B 15/063
                                                        340/928
2008/0084272 A1  4/2008  Modiano
2009/0083185 A1* 3/2009  Robinson ............... G07B 15/06
                                                         705/50

OTHER PUBLICATIONS

Asha Mehrotra, "Cellular Radio Performance Engineering," Artech House (Boston), 1994, p. 489.

Persad et al., "Toll Collection Technology and Best Practices," http://www.utexas.edu/research/ctr/pdf_reports/0_5217_P1.pdf, retrieved Oct. 21, 2010.

Raymond Steel (ed), "Mobile Radio Communications," Pentech Press (London), 1992, pp. 24-25.

* cited by examiner

PAYMENT OF HIGHWAY TOLLS VIA A MOBILE TELECOMMUNICATIONS NETWORK

The present application is a continuation of prior application Ser. No. 12/435,675 filed May 5, 2009, the disclosure of which is herein incorporated by reference in its entirety.

BACKGROUND OF THE INVENTION

The present invention relates generally to payment of highway tolls, and more particularly to payment of highway tolls via a mobile telecommunications network.

Funding the construction and maintenance of highways via tolls collected from drivers is a common practice. Drivers pay tolls at toll booths erected along a highway, or at highway entrances and exits. Toll booths may also be erected at the entrances and exits of tunnels and bridges. The most established practice calls for a driver to stop and pay an attendant. Various automated schemes such as mechanized collection baskets for coins or tokens have evolved over the years. Recent systems use a radio frequency (RF) transceiver mounted on a car (mobile transceiver). As a car passes through a toll booth, an RF transceiver mounted in the toll booth (fixed transceiver) queries the mobile transceiver, which transmits a unique identification code linked to a payment account. The fixed transceiver receives the identification code and forwards it to a billing system, which then bills a payment account of the driver.

Although the RF transaction system is an improvement over previous schemes, it has several shortcomings, which include: (a) A highway authority incurs great expense to install infrastructure dedicated solely for toll collection. (b) Each vehicle that uses the RF transaction system is required to have a registered mobile transceiver. Problems may then arise if a driver rents a car or borrows a car that is not equipped with a registered mobile transceiver. (c) Not all RF transaction systems are compatible. A mobile transceiver which operates with an RF transaction system in one state does not necessarily operate with an RF transaction system in another state.

What is needed is a universal system for automated payment of highway tolls. A system that does not require dedicated infrastructure is advantageous.

BRIEF SUMMARY OF THE INVENTION

In an embodiment of the invention, a mobile telecommunications device communicates with a mobile telecommunications service provider. The mobile telecommunications service provider receives a request to calculate a route to a destination. The mobile telecommunications service provider determines the location of the mobile telecommunications device from a global navigation satellite system or from a mobile telecommunications network and calculates a route. The mobile telecommunications service provider then identifies toll booths along the calculated route.

In an embodiment of the invention, the mobile telecommunications service provider pre-pays the tolls. The mobile telecommunications service provider sends turn-by-turn instructions to the mobile telecommunications device and tracks the location of the mobile telecommunications device and records the date and time at which the mobile telecommunications device passes through a toll booth.

These and other advantages of the invention will be apparent to those of ordinary skill in the art by reference to the following detailed description and the accompanying drawings.

DETAILED DESCRIPTION

Mobile telecommunications networks have been widely deployed, and the number of subscribers continues to increase. Mobile telecommunications devices, such as wireless phones and laptops outfitted with wireless modems, may transmit and receive multimedia content (voice, video, and data). Mobile telecommunications devices commonly operate on cellular networks, but may also operate on other wireless networks such as WiMax. Since several mobile telecommunications networks cover the entire country (international service may also be available), a single mobile telecommunications device may operate consistently across the country. Mobile telecommunications networks may also have the capability to track the location of a specific mobile telecommunications device. Embodiments of the invention use the location-tracking capability to determine when a vehicle carrying a mobile telecommunications device is passing through a specific toll booth.

Figure 1A:
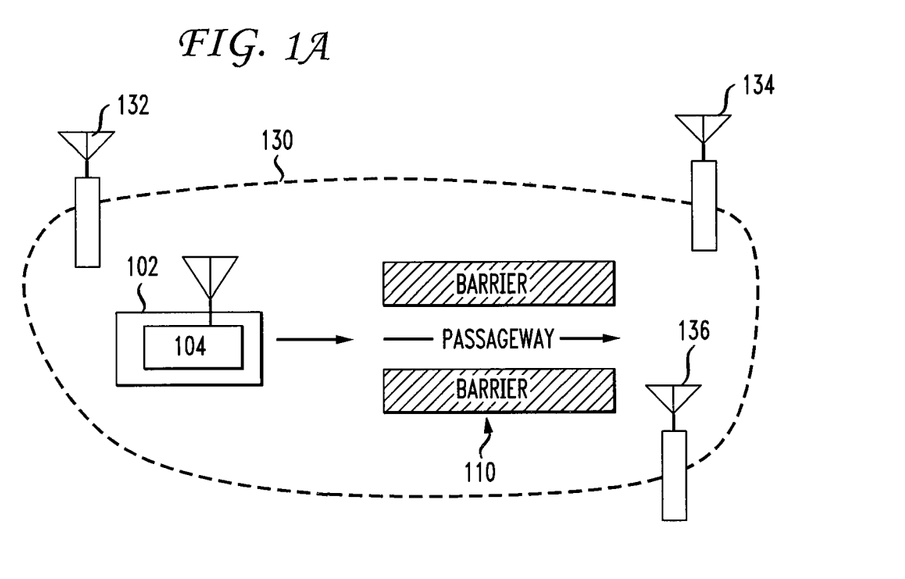
FIG. 1A-FIG. 1C show schematics of toll booths with location-tracking systems.
Figure 1B:
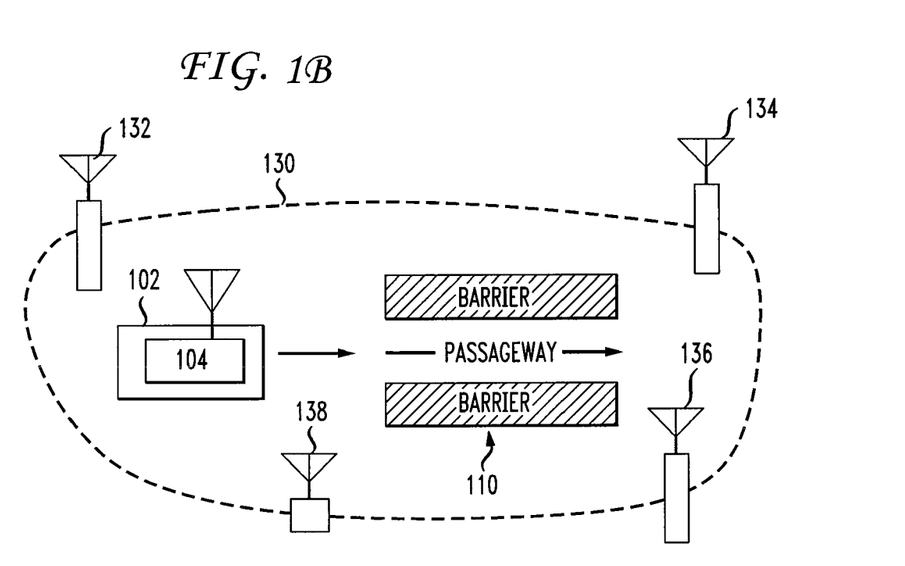
Figure 1C:
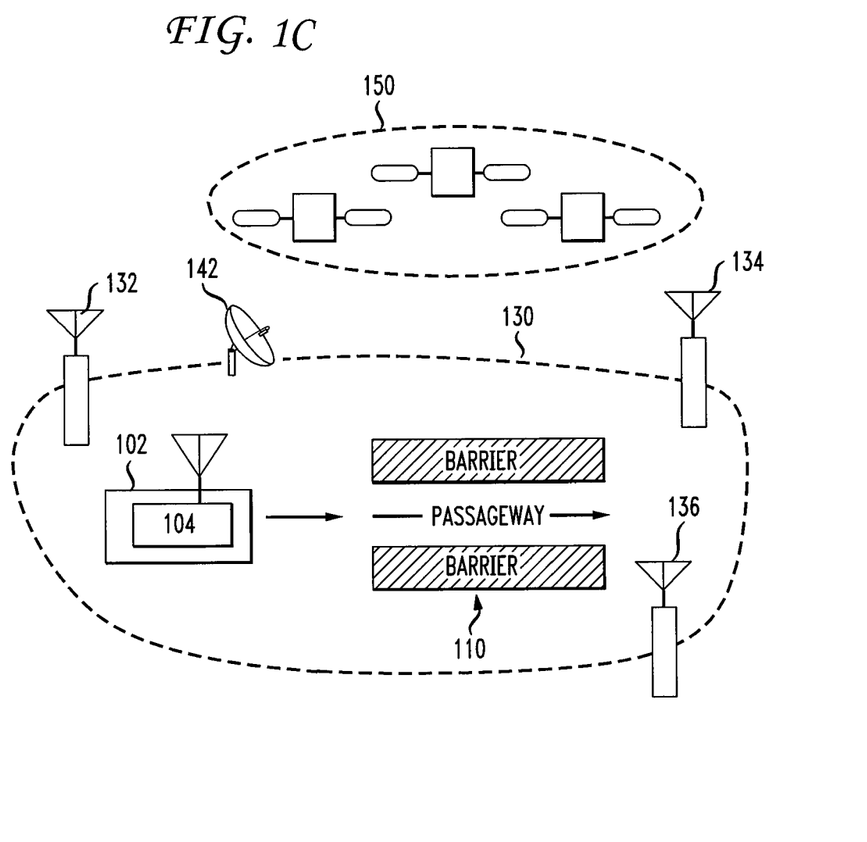

There are several schemes for location tracking by a mobile telecommunications network. Three examples are shown in FIG. 1A-FIG. 1C. In FIG. 1A, vehicle 102 carries a mobile telecommunications device (MTD) 104. Herein, a vehicle refers to any entity subject to a toll when passing through a toll booth. Vehicles include cars, trucks, and motorcycles. MTD 104, for example, is a cell phone which the driver (also referred to as the subscriber) may conveniently carry from one vehicle to another. Radio frequency (RF) transmissions containing messages from MTD 104 are received by mobile telecommunications network 130, operated by a mobile telecommunications service provider (such as a cell phone service provider). Through a process of triangulation of RF signals received by cell tower 132—cell tower 136, the location of MTD 104 may be tracked. In FIG. 1A, for example, vehicle 102 is approaching toll booth 110. If triangulation by cell towers does not provide sufficient accuracy, a microcell transceiver 138 may be positioned in the vicinity of toll booth 110 (FIG. 1B). In one system configuration, a microcell transceiver is installed at each toll booth. In other system configurations, one or more microcell transceivers provide RF coverage for all toll booths at a toll plaza. Note that microcell transceiver 138 is not dedicated for the processing of toll payments. It is integrated into the overall mobile telecommunications network 130 and provides the same mobile telecommunications services as macrocell base stations, resulting in a seamless network.

Global navigation satellite systems (GNSSs) may also be used for location tracking. They are capable of determining locations with high accuracy in near-real time. Examples of GNSSs include the Global Positioning System (GPS) [USA] and Global Orbital Navigation System (GLONASS) [Russia]. Other GNSSs, such as Galileo [European], are being planned. In the discussions below, GPS is used as a specific example of a GNSS. In GPS, a constellation of satellites transmit radio signals at a fixed carrier frequency. The two principal carrier frequencies are 1.57542 GHz (L1 carrier) and 1.22760 GHz (L2 carrier). The L1 carrier is modulated with a coarse acquisition (C/A) pseudorandom (PR) code, which is inversely modulated by binary information symbols. The PR code transmitted from a specific satellite uniquely identifies the specific satellite. Information carried in the radio signal includes the orbit position of the satellite. A single satellite channel refers to a (carrier, PR code) pair. A GPS receiver on Earth receives a satellite channel and decodes the information. From the delay time between the time of transmission of the PR code by the satellite and the time of reception of the PR code by the receiver, the distance between the receiver and the satellite may be calculated if the velocity of the radio signal is known. By calculating the distances between the receiver and several (typically four) satellites whose positions are known, the position of the receiver may be calculated. Higher accuracy may be achieved by tracking carrier phases and using advanced signal-processing techniques to correct for transmission anomalies.

Compact, low-power, low-cost GPS receivers have been integrated into mobile telecommunications devices. These mobile telecommunications devices are commonly referred to as GPS phones. The coordinates determined by the GPS receiver may then be transmitted by the GPS phone to the mobile telecommunications service provider, which may then track the location of the GPS phone in near-real time. Hybrid systems, commonly referred to as assisted GPS (A-GPS), integrate the location-tracking capabilities of GPS and mobile telecommunications networks. They have the capability of providing faster response times and wider coverage under a broader range of operating conditions than GPS by itself. In FIG. 1C, mobile telecommunications network 130 includes a GPS receiver 142 to provide A-GPS service. MTD 104 has a GPS receiver that communicates with GPS network 150. MTD 104 also receives A-GPS information from mobile telecommunications network 130.

Note that the location of MTD 104 may be tracked by combinations of the systems illustrated in FIG. 1A-FIG. 1C.

The capability to track the location of a GPS phone has allowed mobile telecommunications service providers to offer turn-by-turn (T-B-T) navigation services, similar to those provided by stand-alone GPS navigation systems. A subscriber communicates with the mobile telecommunications service provider via a GPS phone and activates the navigation service. The subscriber then enters the desired destination. The mobile telecommunications service provider determines the location of the GPS phone and, using a database of geographical information, plots a route to the destination. The routing information is transmitted to the GPS phone. Depending on the capabilities of the GPS phone, a map may be displayed on a video display, and T-B-T instructions may be provided to the driver via an audio announcement system.

Figure 2:
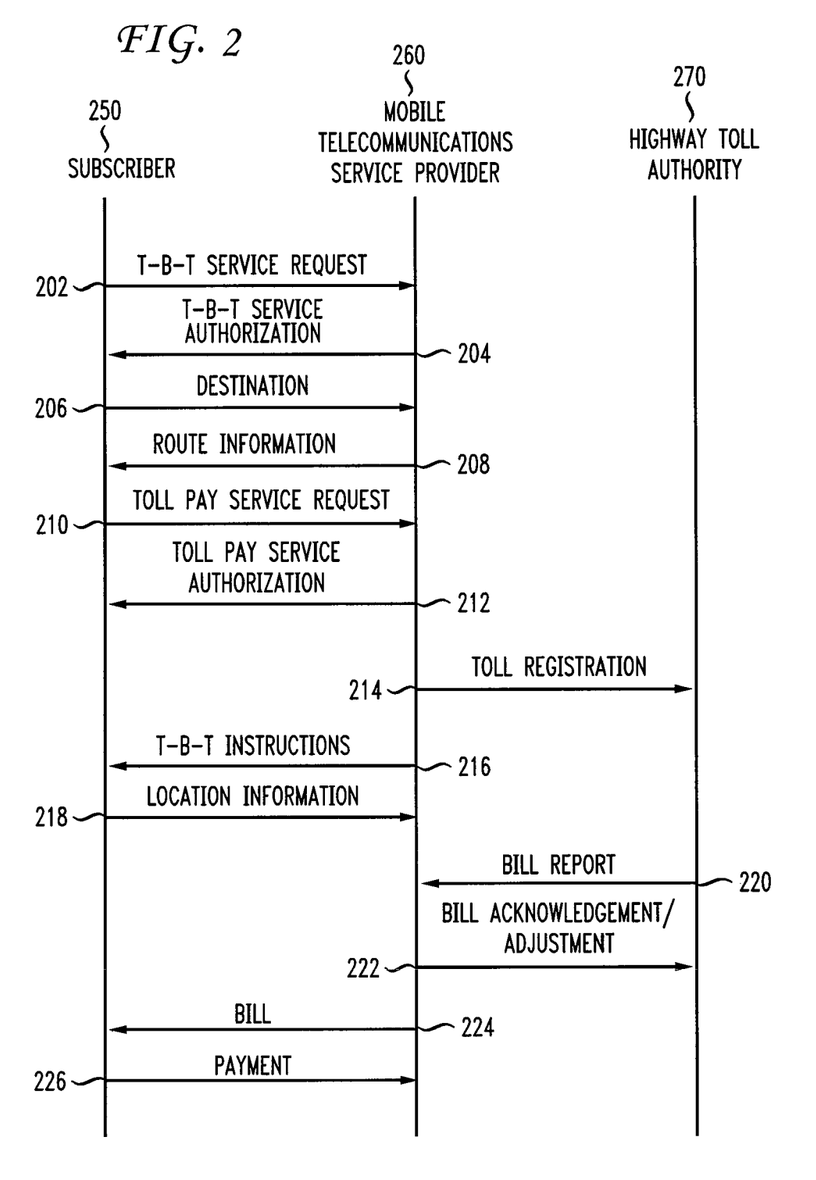
FIG. 2 shows a message flow diagram for processing payment of highway tolls via a mobile telecommunications network.

FIG. 2 shows a message flow diagram between entities (parties) involved in an embodiment of the invention: subscriber 250, mobile telecommunications service provider 260, and highway toll authority 270. In general, more than one highway toll authority may be involved (for example, if the driver travels across more than one state). Subscriber 250 uses a mobile telecommunications device to communicate over a mobile telecommunications network with a communications system, which may include a computer or server, operated by mobile telecommunications service provider 260. Mobile telecommunications service provider 260 uses a communications system to communicate over a communications network, which may be wireless or land-line, with a communications system operated by highway toll authority 270 (as discussed below with respect to FIG. 4).

Subscriber 250 initiates the T-B-T service by sending T-B-T service request 202 to mobile telecommunications service provider 260, which consults its database of subscribers registered for the T-B-T service. If subscriber 250 is registered, then mobile telecommunications service provider 260 returns T-B-T service authorization 204 to subscriber 250. Subscriber 250 then sends destination 206 to mobile telecommunications service provider 260, which determines the location of subscriber 250, plots the route to the destination, and returns route information 208 to subscriber 250.

Route information 208 includes the location of toll booths and the amount of tolls to be paid. Subscriber 250 then sends toll pay service request 210 to mobile telecommunications service provider 260, which consults its database of subscribers registered for the toll pay service. If subscriber 250 is registered, then mobile telecommunications service provider 260 returns toll pay service authorization 212 to subscriber 250.

Information provided in toll pay service request 206 includes the license plate of the car that subscriber 250 is driving. Toll booths are typically equipped with cameras which photograph license plates. In the event of a suspected toll evader, the highway toll authority compares the license plate numbers against a database of subscribers to an automated toll payment system, such as the dedicated RF transaction system described earlier. If the license plate number is registered, then the toll is charged against the driver's account. If the license plate number is not registered, then the driver is sent a fine.

Mobile telecommunications service provider 260 sends toll registration information 214 to highway toll authority 270 that has jurisdiction over the toll booths along the planned route. As discussed above, more than one highway toll authority may be involved. Toll registration information 214 includes the license plate number of the vehicle that subscriber 250 is driving, the locations of the toll booths along the planned route, and advance payment (pre-payment) for the tolls (or authorization to charge a payment account for the tolls).

Mobile telecommunications service provider 260 sends T-B-T instructions 216 to subscriber 250, who then drives along the planned route. Location information 218 of subscriber 250 is constantly received by mobile telecommunications service provider 260, which tracks the location of subscriber 250 as a function of time. In an embodiment of the invention, mobile telecommunications service provider 260 records the location of subscriber 250 as a function of time. In particular, mobile telecommunications service provider 260 records the specific date and time at which subscriber 250 passes through a specific toll booth. If subscriber 250 deviates from the planned route, mobile telecommunications service provider 260 recalculates the route and sends updated toll registrations to highway toll authority 270.

At times agreed upon by mobile telecommunications service provider 260 and highway toll authority 270, highway toll authority 270 sends bill report 220 to mobile telecommunications service provider 260. Bill report 220 includes records of the toll transactions (as reported by license plate number) for subscriber 250. Mobile telecommunications service provider 260 then compares the entries in bill report 220 to its log of the toll booths passed by subscriber 250 and sends bill acknowledgement/adjustment 222 to highway toll authority 270. If there are any discrepancies, mobile telecommunications service provider 260 and highway toll authority 270 resolve the discrepancies according to a pre-determined dispute resolution procedure.

Mobile telecommunications service provider 260 periodically (for example, once a month) sends a bill 224 to subscriber 250. Highway toll charges, for example, may be included in the monthly cell phone bill. Subscriber 250 then sends payment 226 to mobile telecommunications service provider 260.

Figure 3A:
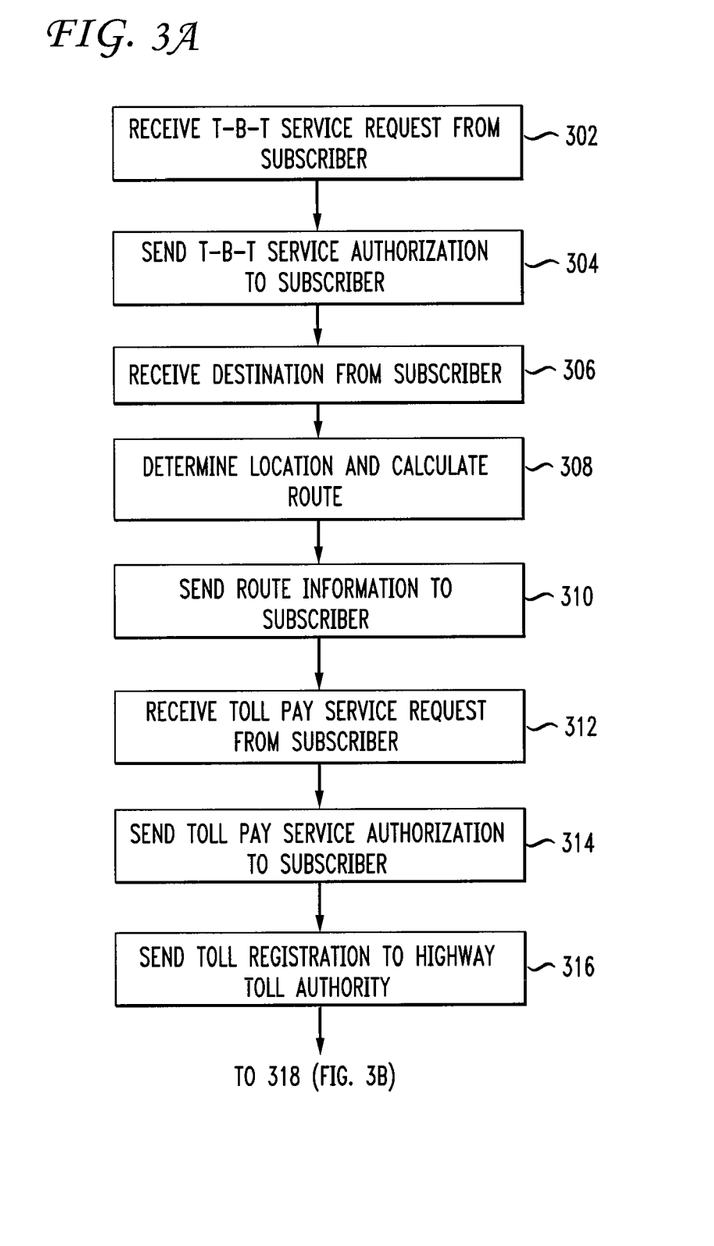
FIG. 3A and FIG. 3B show a flowchart of steps for a method for processing payment of highway tolls via a mobile telecommunications network.
Figure 3B:
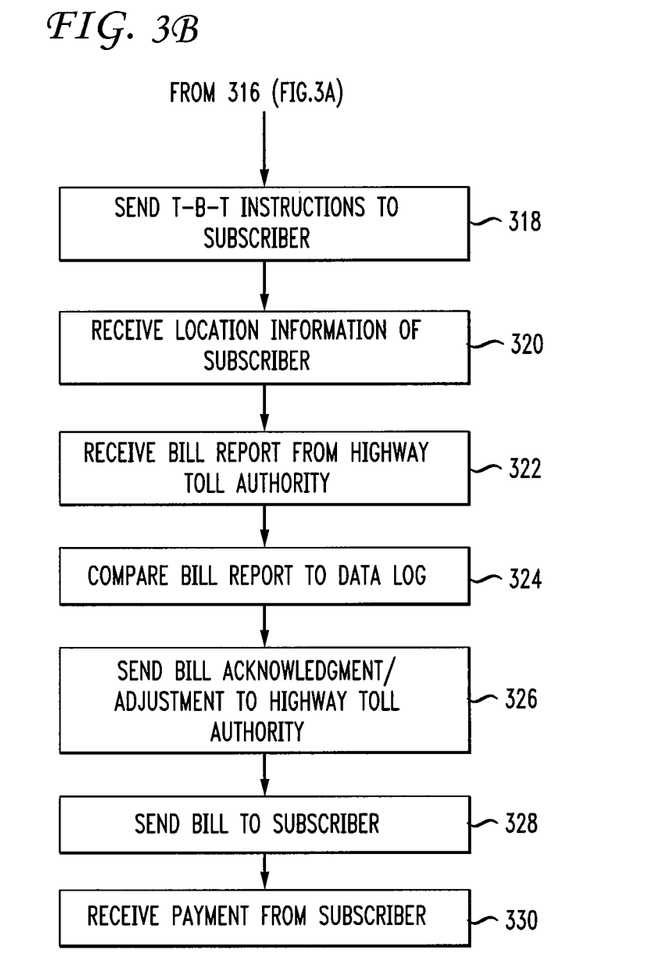

FIG. 3A and FIG. 3B show a flowchart of steps for processing payment of highway tolls via a mobile telecommunications network, as viewed from the perspective of mobile telecommunications service provider 260. In step 302 (FIG. 3A), mobile telecommunications service provider 260 receives T-B-T service request 202 from subscriber 250. The process then passes to step 304, in which mobile telecommunications service provider 260 sends T-B-T service authorization 204 to subscriber 250. The process then passes to step 306, in which mobile telecommunications service provider 260 receives destination 206 from subscriber 250. The process then passes to step 308, in which mobile telecommunications service provider 260 determines the location of subscriber 250 and calculates the route to the destination.

The process then passes to step 310, in which mobile telecommunications service provider 260 sends route information 208 to subscriber 250. In step 312, mobile telecommunications service provider 260 receives toll pay service request 210 from subscriber 250. The process then passes to step 314, in which mobile telecommunications service provider 260 sends toll pay service authorization 212 to subscriber 250. The process then passes to step 316, in which mobile telecommunications service provider 260 sends toll registration 214 to highway toll authority 270. The process then passes to step 318 (FIG. 3B), in which mobile telecommunications service provider 260 sends T-B-T instructions 216 to subscriber 250. In step 320, as the subscriber 250 drives along the route, mobile telecommunications service provider 260 receives location information 218 of subscriber 250.

In step 322, mobile telecommunications service provider 260 receives bill report 220 from highway toll authority 270. The process then passes to step 324, in which mobile telecommunications service provider 260 compares the entries in bill report 220 with the entries in its data log for subscriber 250. The process then passes to step 326, in which mobile telecommunications service provider 260 sends bill acknowledgement/adjustment to highway toll authority 270. If there are any discrepancies, mobile telecommunications service provider 260 and highway toll authority 270 resolve any disputes. For example, mobile telecommunications service provider 260 may present records showing whether or not subscriber 250 passed through a specific toll booth at a specific date and time. The process then passes to step 328, in which mobile telecommunications service provider 260 sends bill 224 to subscriber 250. In step 330, mobile telecommunications service provider 260 receives payment 226 from subscriber 250.

Figure 4:
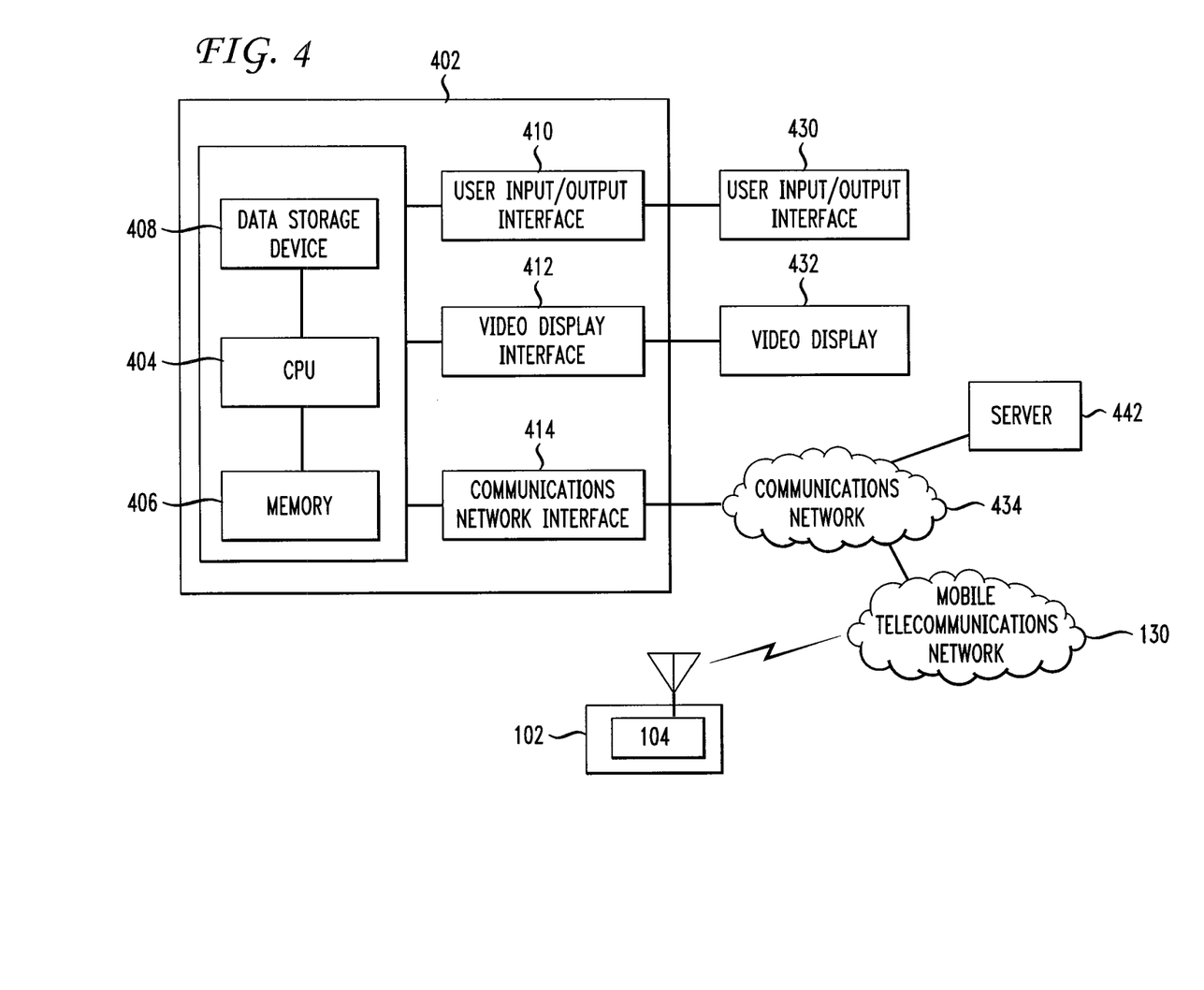
FIG. 4 shows a high-level schematic of a computer which may be used to implement a system for processing payment of highway tolls via a mobile telecommunications network.

One embodiment of a highway toll payment system via a mobile telecommunications network may be implemented using a computer. As shown in FIG. 4, computer 402 may be any type of well-known computer comprising a central processing unit (CPU) 404, memory 406, data storage device 408, and user input/output interface 410. Data storage device 408 may comprise a hard drive, non-volatile memory, or other computer readable medium (such as a magnetic disk or compact disc read only memory). User input/output interface 410 may comprise connections to a user input/output device 430, such as a mouse or keyboard, which enable a user to operate computer 402.

As is well known, a computer operates under control of computer software which defines the overall operation of the computer and applications. CPU 404 controls the overall operation of the computer and applications by executing computer program instructions which define the overall operation and applications. The computer program instructions may be stored in data storage device 408 and loaded into memory 406 when execution of the program instructions is desired. The method steps shown in the flowchart in FIG. 3A and FIG. 3B may be defined by computer program instructions stored in the memory 406 or in the data storage device 408 (or in a combination of memory 406 and data storage device 408) and controlled by the CPU 404 executing the computer program instructions. For example, the computer program instructions may be implemented as computer executable code programmed by one skilled in the art to perform algorithms implementing the method steps shown in the flowchart in FIG. 3A and FIG. 3B. Accordingly, by executing the computer program instructions, the CPU 404 executes algorithms implementing the method steps shown in the flowchart in FIG. 3A and FIG. 3B.

Computer 402 may further comprise a video display interface 412, which transforms signals from CPU 404 to signals which drive video display 432. Computer 402 may further comprise one or more network interfaces. For example, communications network interface 414 comprises a connection to communications network 434. Computer 402 may communicate with external servers, such as server 442, via communications network 434. Server 442, for example, may operate billing systems for mobile telecommunications service provider 260 or highway toll authority 270 (see FIG. 2). Communications network 434 may further communicate with mobile telecommunications network 130, which communicates over a wireless link with MTD 104 transported on vehicle 102 (see FIG. 1).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
  receiving a starting location of a mobile telecommunications device associated with a network of a mobile telecommunications service provider;
  receiving a destination;
  generating a calculated route based on the starting location and the destination;
  receiving a message from one of a plurality of microcell transceivers of the network of the mobile telecommunications service provider, the plurality of microcell transceivers associated with a toll plaza along the calculated route, each of the plurality of microcell transceivers installed at a respective one of a plurality of toll booths of the toll plaza; and recording based on the message, a date and a time at which the mobile telecommunications device passed through one of the plurality of toll booths of the toll plaza.

2. The method of claim 1, wherein the plurality of microcell transceivers provide radio frequency coverage for the plurality of toll booths of the toll plaza.

3. The method of claim 2, wherein the plurality of microcell transceivers determine a location of the mobile telecommunications device with respect to the toll plaza.

4. The method of claim 1, further comprising:
receiving a recorded toll transaction from an entity associated with the toll plaza;
comparing a date and a time of the recorded toll transaction with the date and the time at which the mobile telecommunications device passed through one of the plurality of toll booths of the toll plaza along the calculated route;
determining a discrepancy between the date and the time of the recorded toll transaction and the date and the time at which the mobile telecommunications device passed through one of the plurality of toll booths of the toll plaza along the calculated route; and
resolving the discrepancy.

5. The method of claim 4, wherein the recorded toll transaction from the entity associated with the toll plaza further comprises an identification of a vehicle associated with the recorded toll transaction, the comparing further comprising:
comparing the identification of the vehicle associated with the recorded toll transaction with an identification of a vehicle associated with the mobile telecommunications device.

6. The method of claim 5, wherein the identification of the vehicle associated with the recorded toll transaction comprises a license number of a license plate of the vehicle associated with the recorded toll transaction.

7. An apparatus comprising:
a processor; and
a memory to store computer program instructions, the computer program instructions when executed on the processor cause the processor to perform operations comprising:
receiving a starting location of a mobile telecommunications device associated with a network of a mobile telecommunications service provider;
receiving a destination;
generating a calculated route based on the starting location and the destination;
receiving a message from one of a plurality of microcell transceivers of the network of the mobile telecommunications service provider, the plurality of microcell transceivers associated with a toll plaza along the calculated route, each of the plurality of microcell transceivers a installed at a respective one of a plurality of toll booths of the toll plaza; and
recording based on the message, a date and a time at which the mobile telecommunications device passed through one of the plurality of toll booths of the toll plaza.

8. The apparatus of claim 7, wherein the plurality of microcell transceivers provide radio frequency coverage for the plurality of toll booths of the toll plaza.

9. The apparatus of claim 8, wherein the plurality of microcell transceivers determine a location of the mobile telecommunications device with respect to the toll plaza.

10. The apparatus of claim 7, the operations further comprising:
receiving a recorded toll transaction from an entity associated with the toll plaza;
comparing a date and a time of the recorded toll transaction with the date and the time at which the mobile telecommunications device passed through one of the plurality of toll booths of the toll plaza along the calculated route;
determining a discrepancy between the date and the time of the recorded toll transaction and the date and the time at which the mobile telecommunications device passed through one of the plurality of toll booths of the toll plaza along the calculated route; and
resolving the discrepancy.

11. The apparatus of claim 10, wherein the recorded toll transaction from the entity associated with the toll plaza further comprises an identification of a vehicle associated with the recorded toll transaction, the comparing further comprising:
comparing the identification of the vehicle associated with the recorded toll transaction with an identification of a vehicle associated with the mobile telecommunications device.

12. The apparatus of claim 11, wherein the identification of the vehicle associated with the recorded toll transaction comprises a license number of a license plate of the vehicle associated with the recorded toll transaction.

13. A non-transitory computer readable medium storing computer program instructions, which, when executed on a processor, cause the processor to perform operations comprising:
receiving a starting location of a mobile telecommunications device associated with a network of a mobile telecommunications service provider;
receiving a destination;
generating a calculated route based on the starting location and the destination;
receiving a message from one of a plurality of microcell transceivers of the network of the mobile telecommunications service provider, the plurality of microcell transceivers associated with a toll plaza along the calculated route, each of the plurality of microcell transceivers associated with installed at a respective one of a plurality of toll booths of the toll plaza; and
recording based on the message, a date and a time at which the mobile telecommunications device passed through one of the plurality of toll booths of the toll plaza.

14. The non-transitory computer readable medium of claim 13, wherein the plurality of microcell transceivers provide radio frequency coverage for the plurality of toll booths of the toll plaza.

15. The non-transitory computer readable medium of claim 14, wherein the plurality of microcell transceivers determine a location of the mobile telecommunications device with respect to the toll plaza.

16. The non-transitory computer readable medium of claim 13, the operations further comprising:
receiving a recorded toll transaction from an entity associated with the toll plaza;

comparing a date and a time of the recorded toll transaction with the date and the time at which the mobile telecommunications device passed through one of the plurality of toll booths of the toll plaza along the calculated route;

determining a discrepancy between the date and the time of the recorded toll transaction and the date and the time at which the mobile telecommunications device passed through one of the plurality of toll booths of the toll plaza along the calculated route; and resolving the discrepancy.

17. The non-transitory computer readable medium of claim 16, wherein the recorded toll transaction from the entity associated with the toll plaza further comprises an identification of a vehicle associated with the recorded toll transaction, the comparing further comprising:

comparing the identification of the vehicle associated with the recorded toll transaction with an identification of a vehicle associated with the mobile telecommunications device.

\* \* \* \* \*